US011623371B2

(12) United States Patent
Chu et al.

(10) Patent No.: US 11,623,371 B2
(45) Date of Patent: Apr. 11, 2023

(54) UV CURING APPARATUS FOR CONTACT-LENS POLYMERIZATION PROCESS

(71) Applicant: HOPE VISION CO., LTD., Miaoli County (TW)

(72) Inventors: Shih Hong Chu, Taichung (TW); Zheng Jun Su, Hsinchu County (TW); Cheng Tai Jao, Toufen (TW); Hsin Pei Yu, Miaoli County (TW); Huan Chiu Tsen, Hsinchu (TW)

(73) Assignee: Hope Vision Co., Ltd., Miaoli County (TW)

( * ) Notice: Subject to any disclaimer, the term of this patent is extended or adjusted under 35 U.S.C. 154(b) by 67 days.

(21) Appl. No.: 17/202,767

(22) Filed: Mar. 16, 2021

(65) Prior Publication Data
US 2022/0212373 A1 Jul. 7, 2022

(30) Foreign Application Priority Data
Jan. 7, 2021 (TW) .................................. 110100601

(51) Int. Cl.
*B29C 35/08* (2006.01)
*B29D 11/00* (2006.01)
(52) U.S. Cl.
CPC .... *B29C 35/0805* (2013.01); *B29D 11/00134* (2013.01); *B29D 11/00259* (2013.01); *B29C 2035/0827* (2013.01); *B29D 11/0048* (2013.01)
(58) Field of Classification Search
CPC ........ B29C 2035/0827; B29C 35/0805; B29C 2045/0075; B29C 33/06; B29D 11/00134;
(Continued)

(56) References Cited

U.S. PATENT DOCUMENTS

2003/0146527 A1* 8/2003 Powers .............. H05B 41/2988
264/1.32
2006/0043623 A1* 3/2006 Powell ............. B29D 11/00317
264/1.32
(Continued)

FOREIGN PATENT DOCUMENTS

| CN | 1427767 A | 7/2003 |
| TW | 200710467 A | 3/2007 |
| TW | 200925697 A | 6/2009 |

OTHER PUBLICATIONS

Official Action Issued By Foreign Patent Office in Corresponding Application 11020753500/110100601.

*Primary Examiner* — Philip C Tucker
*Assistant Examiner* — Jimmy R Smith, Jr.
(74) *Attorney, Agent, or Firm* — Rosenberg, Klein & Lee

(57) ABSTRACT

A UV (ultraviolet) curing apparatus for a contact-lens polymerization process is provided. A UV curing module is equipped for the mold cavities of contact-lens curing molds, including a plurality of first UV light sources arranged above the mold cavities and a plurality of second UV light sources arranged below the mold cavities. A plurality of light output areas of a first light guide device guides the light beams emitted by the first UV light sources to illuminate upper light receiving surfaces of the molds. A plurality of reflecting plates of a second light guide device reflects and scatters the light beams emitted by the second UV light sources to lower light receiving surfaces of the molds. Thereby, the contact-lens polymer inside the molds is uniformly cured, and the yield is raised.

11 Claims, 4 Drawing Sheets

(58) Field of Classification Search
CPC ........ B29D 11/00125; B29D 11/00144; B29D 11/00153; B29D 11/00259
See application file for complete search history.

(56) References Cited

U.S. PATENT DOCUMENTS

2017/0173902 A1* 6/2017 Liu .................... B29D 11/0049
2020/0079006 A1* 3/2020 Kindt-Larsen ......... B29D 11/00

* cited by examiner

UV CURING APPARATUS FOR CONTACT-LENS POLYMERIZATION PROCESS

This application claims priority of Application No. 110100601 filed in Taiwan on 7 Jan. 2021 under 35 U.S.C. § 119; the entire contents of all of which are hereby incorporated by reference.

BACKGROUND OF THE INVENTION

Field of the Invention

The present invention relates to a contact-lens fabrication apparatus, particularly to a UV (ultraviolet) curing apparatus for a contact-lens polymerization process.

Description of the Prior Art

The contact lenses can replace ordinary eyeglasses to overcome problems of vision. Therefore, the contact lens is a popular option for the persons suffering from visual degradation, such as myopia. The contact lens with a colored annularity around the optical area has become an essential fashion accessory in many countries and thus assumes the position of fashion statement. Some types of contact lenses not only can correct vision but also can present a special style of the users.

The fabrication process of contact lenses includes steps of machining, casting, spin-coating, thermal curing/UV curing, etc. Refer to FIG. 1. In the conventional technology of fabricating contact lenses, a conveyor 50 is used to convey a receiving disc 52 carrying a plurality of molds 51; a contact-lens polymer 53 is injected into the molds 51; a plurality of strip-like UV tube lamps 54 is used to illuminate the contact-lens polymer 53, whereby to cure the contact-lens polymer 53; after the molds 51 are split, contact lenses are obtained. In the conventional technology, the UV light is only projected to a single surface of the molds until the whole contact-lens polymer is completely cured, which leads to poor curing effect, different curing extents in different regions of the contact-lens polymer, and poor production efficiency. Further, the uneven curing of the contact-lens polymer is likely to cause instability of the optical region, distorted structure, and cracks, which may seriously affect the yield.

SUMMARY OF THE INVENTION

The primary objective of the present invention is to provide a UV (ultraviolet) curing apparatus for a contact-lens polymerization process, wherein different portions of a UV curing module are respectively arranged above and below mold cavities, and wherein light guide devices are used to let the upper and lower light receiving surfaces of the molds be fully illuminated by the curing light, whereby the contact-lens polymer inside the molds are cured uniformly, and whereby is shortened the curing time, promoted the yield and decreased the fabrication cost.

In order to achieve the abovementioned objective, the present invention provides a UV curing apparatus for a contact-lens polymerization process. The UV curing apparatus of the present invention comprises a carrying device, a UV curing module, a first light guide device and a second light guide device. The carrying device includes a plurality of mold cavities. The plurality of mold cavities respectively carries molds. The mold receives a contact-lens polymer. The mold has an upper light receiving surface and a lower light receiving surface. The upper light receiving surface is a planar surface, and the lower light receiving surface is a curved surface. The UV curing module includes a plurality of first UV light sources and a plurality of second light UV light sources. The first UV light sources are arranged above the mold cavities. The second UV light sources are arranged below the mold cavities. The first light guide device includes a plurality of light output areas. The light output areas are respectively corresponding to the first UV light sources and disposed between the first UV light sources and the mold cavities, whereby the first light guide device guides the light beams emitted by the first UV light sources to pass through the corresponding light output areas and illuminate the corresponding upper light receiving surfaces of the molds. The second light guide device includes a plurality of reflecting plates. The reflecting plates respectively surround the second UV light sources, whereby the second UV light sources are partitioned by the reflecting plates, and whereby the light beams emitted by the second UV light sources are respectively reflected by the reflecting plates and then scattered to the lower light receiving surfaces of the molds.

According to one embodiment of the present invention, the first UV light sources and the second light UV light sources are light-emitting diodes.

According to one embodiment of the present invention, the first light guide device includes a substrate. A plurality of light guide holes is formed on the substrate to function as the light output areas. The light guide device constrains the light beams emitted by the first UV light sources to transmit inside the light guide holes.

According to one embodiment of the present invention, the diameter of each of the light guide holes is gradually decreased from the position near the first UV light sources to the position far away from the first UV light sources.

According to one embodiment of the present invention, the substrate includes a delustering material. In one embodiment, the substrate is made of a plastic material. Preferably, the substrate is made of a glass or metallic material coated with a delustering film.

According to one embodiment of the present invention, the first light guide device includes a plurality of light-focusing lenses, which form the plurality of light output areas. The first light guide device passes the light beams emitted by the first UV light sources through the light-focusing lenses and then vertically projects onto the upper light receiving surface of the mold. Preferably, the light-focusing lens is a Fresnel lens.

According to one embodiment of the present invention, the reflecting plate is made of a glass or metallic material. Alternatively, the reflecting plate is made of a material coated with a reflecting film.

Below, embodiments are described in detail to make easily understood the objectives, characteristics and accomplishments of the present invention.

DETAILED DESCRIPTION OF THE INVENTION

Figure 2:
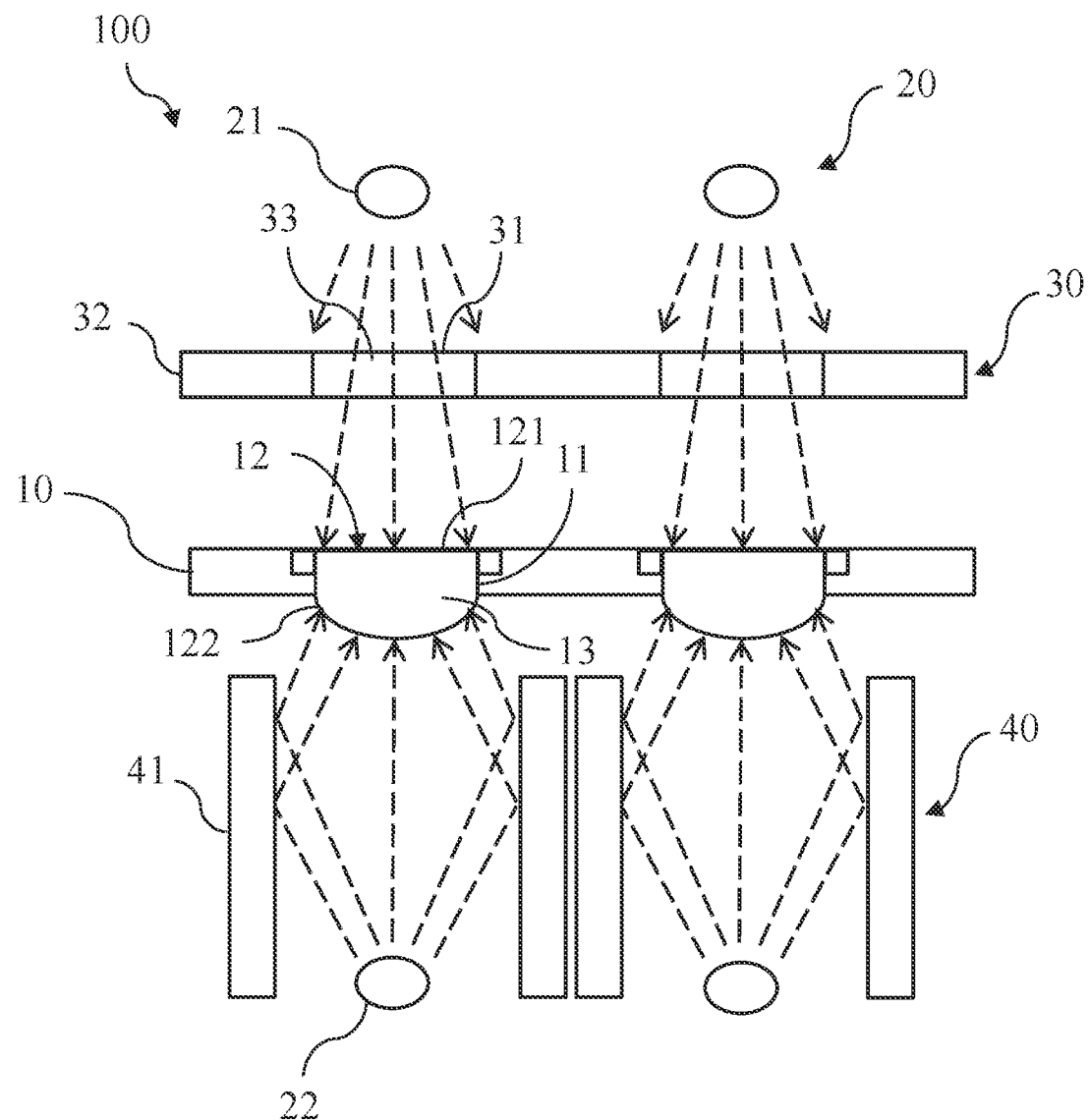
FIG. 2 is a sectional view schematically showing a UV curing apparatus for a contact-lens polymerization process according to a first embodiment of the present invention.

Refer to FIG. 2. FIG. 2 is a sectional view schematically showing a UV (ultraviolet) curing apparatus 100 for a contact-lens polymerization process according to a first embodiment of the present invention. In this embodiment, the UV curing apparatus 100 comprises a carrying device 10, a UV curing module 20, a first light guide device 30 and a second light guide device 40. A plurality of mold cavities 11 is intermittently disposed in the carrying device 10. The mold cavity 11 is a space used to carry a mold 12. The mold 12 is made of a light-permeable material, such as a PP plastic, allowing the UV ray to pass. The mold 12 includes an upper light receiving surface 121 and a lower light receiving surface 122 opposite to the upper light receiving surface 121. The upper light receiving surface 121 is a planar surface. The lower light receiving surface 122 is a curved surface. A contact-lens polymer 13 is disposed inside the mold 12. It is well known by the persons skilled in the art: the contact-lens polymer 13 is a material, which can be polymerized to form a contact lens. The contact-lens polymer 13 may be a hydrophilic monomer (such as Poly (2-hydroxyethyl methacrylate)), a hydrophobic monomer (such as siloxane) or a monomer mixture thereof. The contact-lens polymer 13 may further include another material or component having a special function, such as a photoinitiator, a thermal initiator, or an additive for increasing the hydrophilicity of the contact lens.

The UV curing module 20 includes a plurality of first UV light sources 21 and a plurality of second UV light sources 22. The first UV light sources 21 are arranged above the mold cavities 11 and the second UV light sources 22 are arranged below the mold cavities 11 such that the upper region and the lower region of each mold cavity 11 are substantially corresponding to one first UV light source 21 and one second UV light source 22 respectively. In this embodiment, the first UV light sources 21 and the second UV light sources 22 are light-emitting diodes. Each light-emitting diode is a point light source where brightness is concentrated.

The first light guide device 30 includes a plurality of light output areas 31. Each light output area 31 is corresponding to one first UV light source 21 and disposed between the first UV light source 21 and the mold cavity 11, whereby to guide the light beam emitted by the first UV light source 21 to pass through the corresponding light output area 31 and illuminate the upper half of the mold cavity 11, i.e. illuminate the upper light receiving surface 121 of the mold 12. In this embodiment, the first light guide device 30 includes an opaque substrate 32 and a plurality of light guide holes 33. The light guide holes 33 form the plurality of light output areas 31. The light guide hole 33 constrains the light beam emitted by the corresponding first UV light source 21 to transmit inside the light guide hole 33, whereby the light is concentrated to illuminate the upper light receiving surface 121, and whereby the upper light receiving surface 121 is exempted from being interfered with by neighboring light sources.

The second light guide device 40 includes a plurality of reflecting plates 41. The reflecting plates 41 respectively surround the second UV light sources 22, whereby the plurality of second UV light sources 22 is partitioned by the reflecting plates 41, and whereby the light beam emitted by one second UV light source 22 is reflected by the corresponding reflecting plate 41 and then scattered to the lower half of the mold cavity 11, i.e. scattered to the lower light receiving surface 122 of the mold 12. In this embodiment, because the second UV light source 22 is surrounded by the corresponding reflecting plate 41, the light beam emitted by the second UV light source 22 is constrained to travel inside the corresponding reflecting plate 41 and exempted from being interfered with by neighboring light sources. In this embodiment, the reflecting plate 42 varies the travel path of light; the light is scattered after reflection. Because the lower light receiving surface 122 is a curved surface, the lower light receiving surface 122 is uniformly illuminated.

In one embodiment, the substrate 32 may include a delustering material, which can decrease the refraction while the light passes through the light guide hole 33. In one embodiment, the substrate 32 is made of a plastic material. In another embodiment, the substrate 32 is made of a glass or metallic material coated with a delustering film. In one embodiment, the reflecting plate 41 is made of a material having a superior refraction function, whereby the lower light receiving surface 122 of the mold 12 can be uniformly illuminated. In one embodiment, the reflecting plate 41 is made of a glass or metallic material. In one embodiment, the reflecting plate 41 is made of any material coated with a reflecting film.

Figure 1:
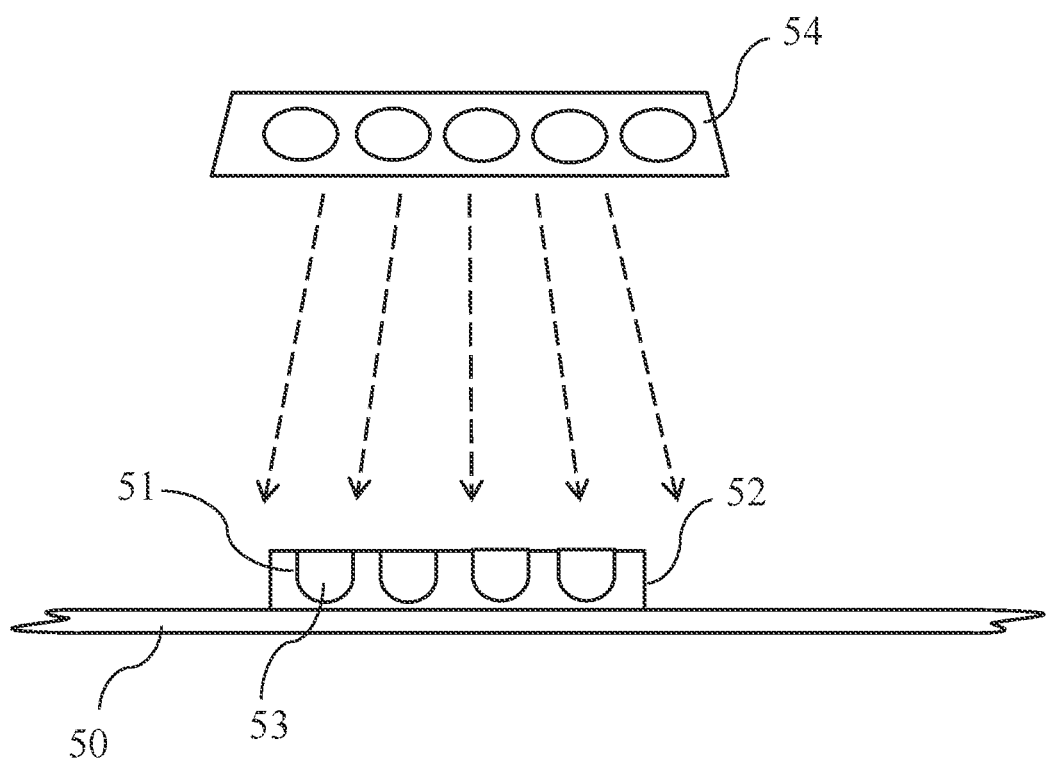
FIG. 1 shows a conventional UV curing apparatus for contact-lenses.

In one embodiment, the carrying device 10 is a transport mechanism (such as the conveyor 50 in FIG. 1), which moves in an inching way to transport each mold cavity 11 to a position between one first UV light source 21 and one second UV light source 22, whereby the mold 12 carried by each mold cavity 11 is arranged corresponding to the first UV light source 21 and the second UV light source 22, and whereby the contact-lens polymer 13 inside the mold 12 is cured by the illumination of UV light. After cooling down, the mold 12 is split to obtain a contact lens. Via the first light guide device 30 and the second light guide device 40, the present invention makes the light beams of the first UV light source 21 and the second UV light source 22 able to effectively illuminate the whole mold cavity 11. Thereby, the upper light receiving surface 121 and the lower light receiving surface 122 are fully illuminated, and the contact-lens polymer 13 inside the mold 12 is uniformly cured. Thus, the present invention can shorten the curing time, promote the yield and decrease the fabrication cost.

Figure 3:
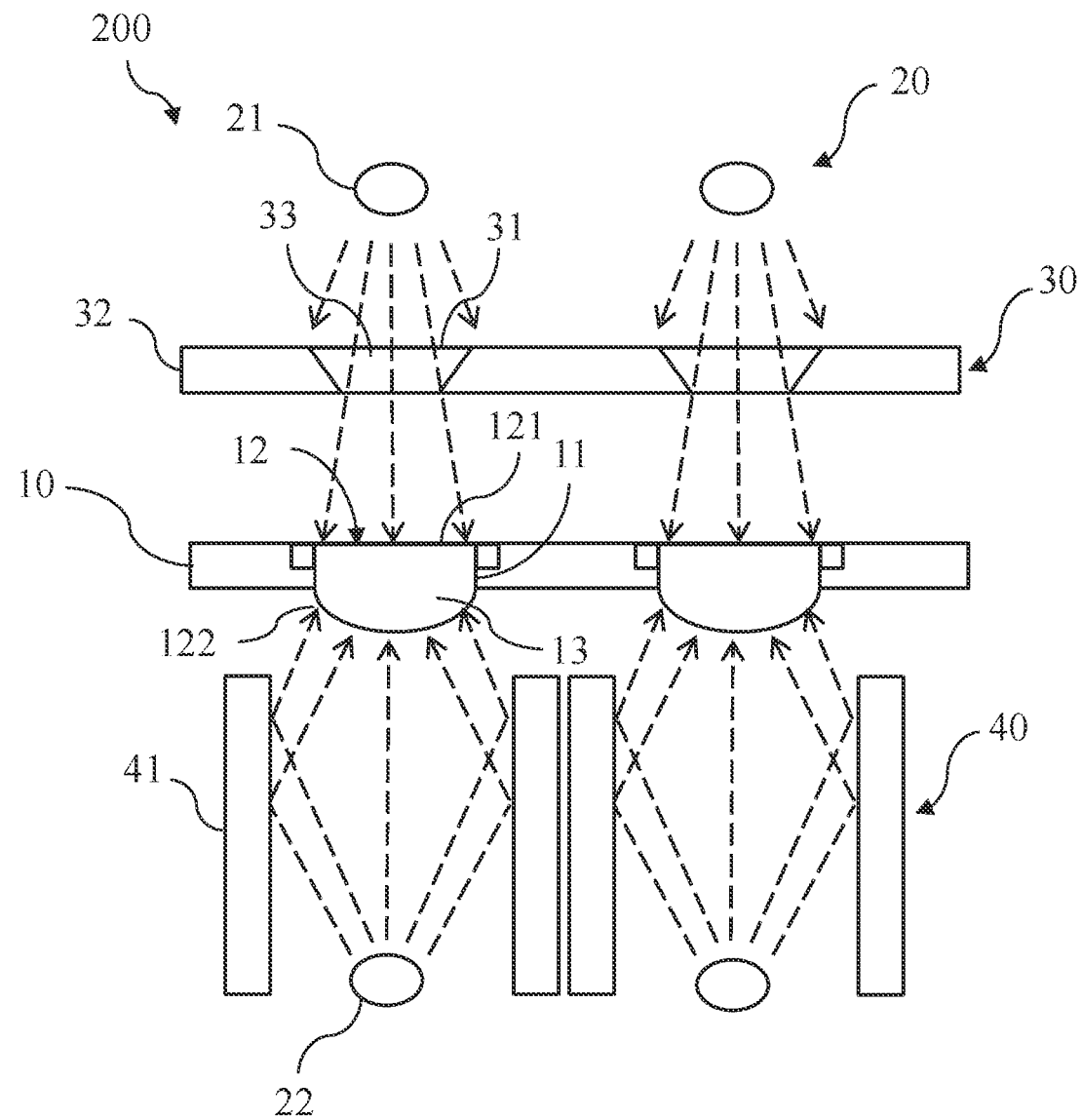
FIG. 3 is a sectional view schematically showing a UV curing apparatus for a contact-lens polymerization process according to a second embodiment of the present invention.

In the abovementioned embodiments, the diameter of the light guide hole 33 is slightly greater than the light source and designed to be a cylindrical-shaped hole. However, the present invention does not limit the shape and size of the light guide hole 33 but allows the shape and size to be modified according to practical requirement. Refer to FIG. 3. FIG. 3 is a sectional view schematically showing a UV curing apparatus 200 for a contact-lens polymerization process according to a second embodiment of the present invention. The second embodiment is different from the first embodiment in that the diameter of the light guide hole 33 is gradually decreased from the position near the first UV light source 21 to the position far away from the first UV light source 21. In other words, the light guide hole 33 is a conical-shaped hole in the second embodiment. Therefore, the present invention can make light uniformly illuminate the light receiving surface 121 of the mold 12 via decreasing the divergence angle of the light projecting from the light guide hole 33.

Figure 4:
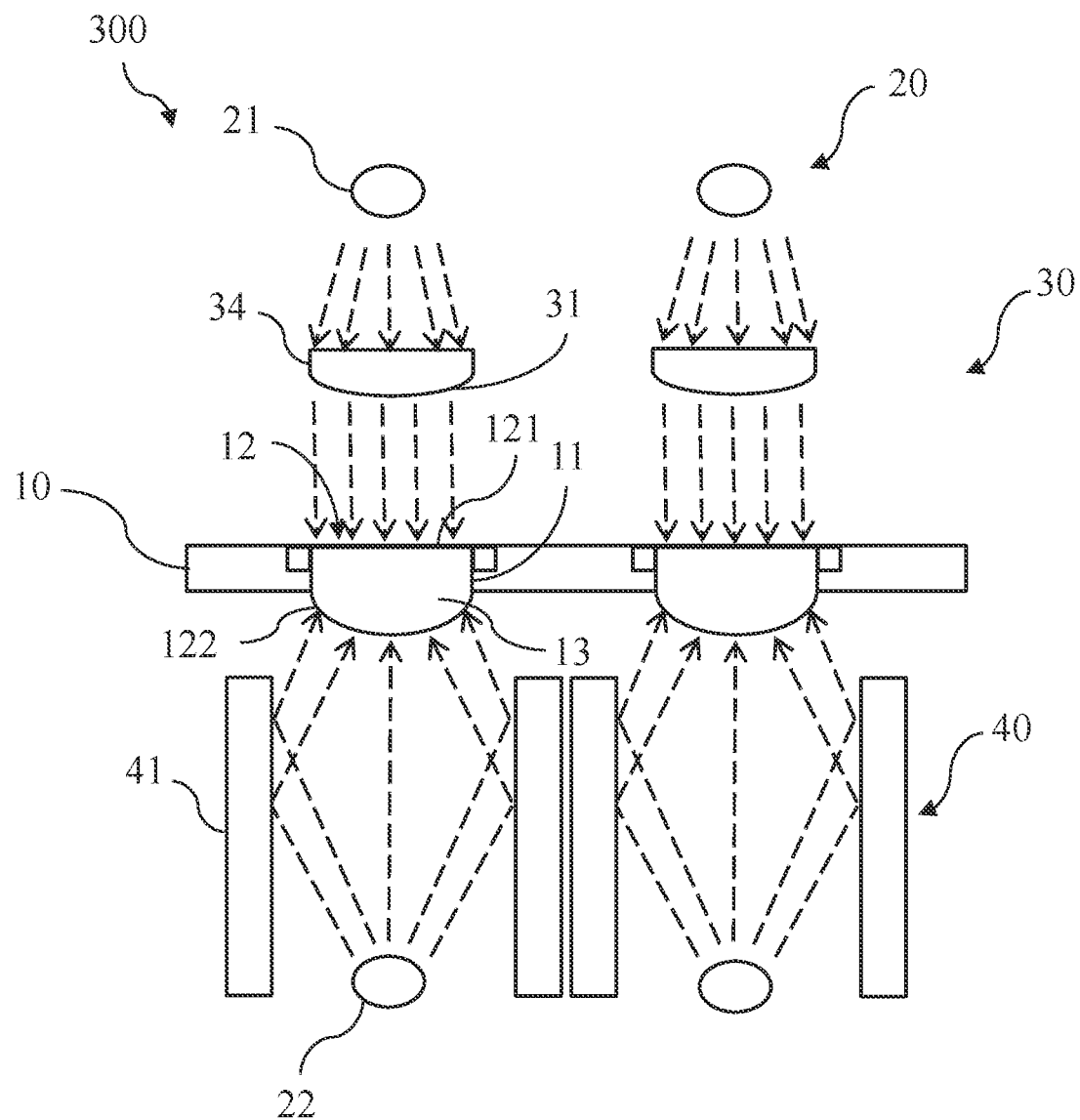
FIG. 4 is a sectional view schematically showing a UV curing apparatus for a contact-lens polymerization process according to a third embodiment of the present invention.

Refer to FIG. 4. FIG. 4 is a sectional view schematically showing a UV curing apparatus 300 for a contact-lens polymerization process according to a third embodiment of the present invention. The third embodiment is different from the first embodiment and the second embodiment in that the first light guide device 30 includes a plurality of light-focusing lenses 34, which form the plurality of light output areas 31. The light-focusing lenses 34 can make the light beams passing through them vertically project onto the upper halves of the mold cavities 11, i.e. vertically project onto the upper light receiving surfaces 121 of the molds 12. In one embodiment, the light-focusing lens 34 is a Fresnel lens. In the third embodiment, the light-focusing lenses 34 are used to modify the illumination paths of the curing light sources and improve the problem of light scattering, whereby the planar light receiving surfaces 121 of the molds 12 can be more uniformly illuminated.

The embodiments described above are only to exemplify the present invention but not to limit the scope of the present invention. Any equivalent modification or variation according to the spirit or characteristics of the present invention is to be also included by the scope of the present invention.

What is claimed is:

1. A UV curing apparatus for a contact lens polymerization process, comprising
    a carrying device, including a plurality of mold cavities, wherein the plurality of mold cavities respectively carries molds; each of the molds receives a contact lens polymer; each of the molds has an upper light receiving surface and a lower light receiving surface; the upper light receiving surface is a planar surface, and the lower light receiving surface is a curved surface;
    a UV (ultraviolet) curing module, including a plurality of first UV light sources and a plurality of second light UV light sources, wherein the first UV light sources are arranged above the mold cavities; the second UV light sources are arranged below the mold cavities;
    a first light guide device, including a plurality of light output areas, wherein each of the light output areas is corresponding to one of the first UV light sources and disposed between the first UV light sources and the mold cavities, and wherein the first light guide device guides light beams emitted by the first UV light sources to pass through the light output areas, which are respectively corresponding to the first UV light sources, and illuminate the upper light receiving surfaces of the molds; and
    a second light guide device, including a plurality of reflecting plates, wherein the reflecting plates respectively surround the second UV light sources to partition the second UV light sources, and wherein the reflecting plates reflect and scatter light beams emitted by the second UV light sources respectively to the lower light receiving surfaces of the molds.

2. The UV curing apparatus for a contact lens polymerization process according to claim 1, wherein the first UV light sources and the second light UV light sources are light-emitting diodes.

3. The UV curing apparatus for a contact lens polymerization process according to claim 1, wherein the first light guide device includes a substrate; a plurality of light guide holes is formed on the substrate to function as the light output areas; the first light guide device constrains the light beams emitted by the first UV light sources to transmit inside the light guide holes.

4. The UV curing apparatus for a contact lens polymerization process according to claim 3, wherein a diameter of each of the light guide holes is gradually decreased from a position closer to the first UV light source to a position further from the first UV light sources.

5. The UV curing apparatus for a contact lens polymerization process according to claim 3, wherein the substrate includes a delustering material.

6. The UV curing apparatus for a contact lens polymerization process according to claim 5, wherein the substrate is made of a plastic material.

7. The UV curing apparatus for a contact lens polymerization process according to claim 5, wherein the substrate is made of a glass or metallic material coated with a delustering film.

8. The UV curing apparatus for a contact lens polymerization process according to claim 1, wherein the first light guide device includes a plurality of light-focusing lenses, which form the plurality of light output areas; the first light guide device passes the light beams emitted by the first UV light sources through the light-focusing lenses and then vertically projects onto the upper light receiving surface of each of the molds.

9. The UV curing apparatus for a contact lens polymerization process according to claim 8, wherein each of the plurality of light-focusing lenses is a Fresnel lens.

10. The UV curing apparatus for a contact lens polymerization process according to claim 1, wherein each of the plurality of reflecting plates is made of a glass or metallic material.

11. The UV curing apparatus for a contact lens polymerization process according to claim 1, wherein each of the plurality of reflecting plates is made of a material coated with a reflecting film.

* * * * *